United States Patent [19]
Jaeschke

[11] 3,863,083
[45] Jan. 28, 1975

[54] FLUID-COOLED DYNAMOMETER

[75] Inventor: Ralph L. Jaeschke, Kenosha, Wis.

[73] Assignee: Eaton Corporation, Cleveland, Ohio

[22] Filed: June 13, 1973

[21] Appl. No.: 369,669

[52] U.S. Cl.................... 310/52, 310/54, 310/58, 310/601, 310/105
[51] Int. Cl..................... H02k 9/19, H02k 49/02
[58] Field of Search.......... 310/105, 52, 54, 58, 59, 310/60, 64

[56] References Cited
UNITED STATES PATENTS

| | | | |
|---|---|---|---|
| 2,871,383 | 1/1959 | King | 310/105 X |
| 3,089,045 | 5/1963 | Derks | 310/53 |
| 3,176,175 | 3/1965 | Jaeschke | 310/105 |
| 3,184,626 | 5/1965 | Luenberger | 310/105 X |
| 3,363,123 | 1/1968 | Jaeschke | 310/105 |
| 3,365,598 | 1/1968 | Jaeschke | 310/105 |
| 3,566,168 | 2/1971 | Matsubara et al. | 310/105 |

*Primary Examiner*—J. D. Miller
*Assistant Examiner*—Patrick R. Salce
*Attorney, Agent, or Firm*—Teagno & Toddy

[57] ABSTRACT

A dynamometer is effectively cooled by passing a cooling fluid through uniquely structured parts of the dynamometer. These parts include an integrally formed combination inductor and housing to which the field coil is directly mounted. The field coil is mounted within a central annular opening extending inside of the housing. The inside of the housing has formed therein a number of circumferential grooves on each side of the annular groove of the coil joined by passageways which allow the cooling fluid to pass between the circumferential grooves and out the housing ends. The cooling fluid passes from the annular field coil groove to the inside of the housing enclosure wherein the cooling fluid is confined within a magnetic gap defined between a rotor assembly and the housing. The rotation of the rotor assembly causes the cooling fluid to be centrifugally distributed along the magnetic gap, into the circumferential grooves and out the housing to thereby dissipate the eddy-current generated heat in the dynamometer.

16 Claims, 3 Drawing Figures

FLUID-COOLED DYNAMOMETER

BACKGROUND OF THE INVENTION

1. Field of the Invention

This invention relates to fluid-cooled eddy-current apparatus in general and more particularly to a liquid cooled dynamometer having a circumferential housing enclosure integrally formed with the inductor of the dynamometer and further having internal circumferential grooves for cooling the apparatus.

2. Background of the Invention

Fluid-cooled eddy-current apparatus, such as dynamometers, are known wherein cooling fluid is used to dissipate heat generated by eddy-currents in the apparatus. These eddy-currents are generated deeply, that is, some distance radially outward from the air gap in the housing. The distance of eddy-current penetration varies inversely proportional to the rotor speed, thus eddy-current heating depth varies with speed and, therefore, means are required to reduce housing temperatures by absorbing this thermal energy.

Older designs such as the dynamometer disclosed in U.S. Pat. No. 3,363,123 to R. L. Jaeschke incorporated cooling channels located on an inductor ring welded into the housing to eliminate heat. This inductor ring was made from material having an electrical resistivity of approximately 11 micro-ohm-centimeter and was spacedly mounted inside the housing enclosure to have one side facing the housing and another side facing a rotor assembly which was rotatably mounted inside of the inductor. A field coil was mounted in an annular enclosure formed in the space existing between the housing and the stator. The side of the welded inductor ring facing the housing was grooved to expose an increased surface area to cooling fluid. The cooling fluid initially entered the space between the housing and the grooved inductor and was communicated to the annular enclosure containing the field coil. From this enclosure the fluid passed to the rotor side of the welded stator where it was centrifugally distributed along the magnetic gap by the rotating action of the rotor.

It will be readily appreciated that the above construction utilizing the internally welded inductor ring and the separately mounted field coil was costly and difficult to assemble. Furthermore, the apparatus was bulky and cumbersome due to the spacing maintained between the inductor ring and the housing.

Other known fluid cooled eddy-current apparatus include the apparatus disclosed in U.S. Pat. No. 3,089,045 to R. J. Derks. The housing enclosure is shown to have an annular internal projection into which the field coil is mounted. The rotor assembly is separated from the housing by a drum assembly. Cooling fluid enters at one end of the housing and is communicated to the space between the drum and the rotor by way of a series of passages. The fluid exits at the other end of the housing after passing through the space between the drum and rotor and after progressing through another series of passages.

The above outlined passages of the Derks' patent are expensive to form and difficult to assemble. These passageways also require added space which makes the apparatus bulky and cumbersome.

SUMMARY OF THE INVENTION

The present invention solves the previously mentioned problems of the known eddy-current apparatus as well as other problems by providing a compact fluid cooled eddy-current apparatus which is simple to assemble and inexpensive to produce and which provides increased magnetic efficiency to the dynamometer by the elimination of the welded inductor rings of the prior art devices. The new apparatus is effectively cooled while maintaining a simple construction and assembly by utilizing an integrally formed housing and stator having cooling grooves therein.

This new apparatus has a construction wherein a shaft is directly connected to a rotor having a pole member assembly mounted to rotate with the rotation of the rotor. A housing spacedly extends around the pole member assembly so as to leave a magnetic gap between the pole member assembly and itself. The ends of the housing are enclosed by cover means which allow the shaft to sealably extend therethrough. The shaft ends of the apparatus are adapted to be easily connectable to a motor which rotates the shaft and the rotor thereby. The housing has a field coil mounted thereto which electromagnetically couples the housing and the pole member assembly. The heat generated by eddy-currents resulting from the electromagnetic coupling of the housing and the pole member assembly being caused by the rotation of the pole member assembly is effectively dissipated by passing cooling fluid along fluid passage means in the housing to absorb the heat generated therein.

The fluid passage means are formed as a pair of circumferential grooves which extend into the body of the housing and which allow fluid to centrifugally flow along them in response to the rotation of the rotor. Passageways extend into the housing to connect the circumferential grooves formed in the housing and thereby allow cooling fluid to be communicated between the grooves and through the housing.

The above novel structure is applied to an eddy-current dynamometer to form the housing enclosure and the inductor member into an integral assembly to which the field coil is directly mounted. The inductor member part of the housing is formed to have fluid passage means which communicate with the enclosed part of the housing. The fluid passage means are formed as annular grooves in the inductor member which are connected by a passageway.

Thus, it will be appreciated that an object of the present invention is to provide an eddy-current apparatus having an integrally formed housing enclosure and inductor member.

Another object of the invention is to provide a fluid cooled eddy-current apparatus having fluid passage means formed in the enclosing side of the housing enclosure to provide a path for the cooling fluid which will effectively cool the apparatus.

A further object of the invention is to provide a fluid cooled eddy-current apparatus wherein the enclosing side of the housing enclosure has a pair of circumferential grooves formed at either end of the housing and connected by a passageway in the housing.

These and other objects of the present invention will be more clearly understood upon a reading of the description of the preferred embodiment in conjunction with the drawings.

DESCRIPTION OF THE PREFERRED EMBODIMENT

Figure 1:
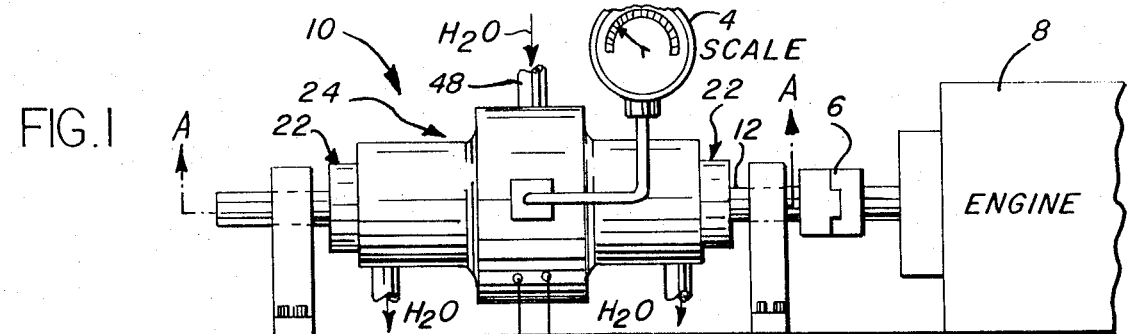
FIG. 1 is a schematic representation of the dynamometer being used to test engine torque.

Referring now to the drawings, the showings are intended to describe the preferred embodiment of the invention and are not presented to limit the invention thereto. To this end, a dynamometer assembly 10 is shown in FIG. 1 set up to test the torque of an engine 8 coupled to the dynamometer 10 by a flexible shaft coupling 6. The torque of the engine 8 is determined by the rotation of the dynamometer housing and stator assembly 24 against a weighting device 4 in response to a predetermined electromagnetic field established within the dynamometer 10 by an electric current as is well known in the art.

Figure 3:
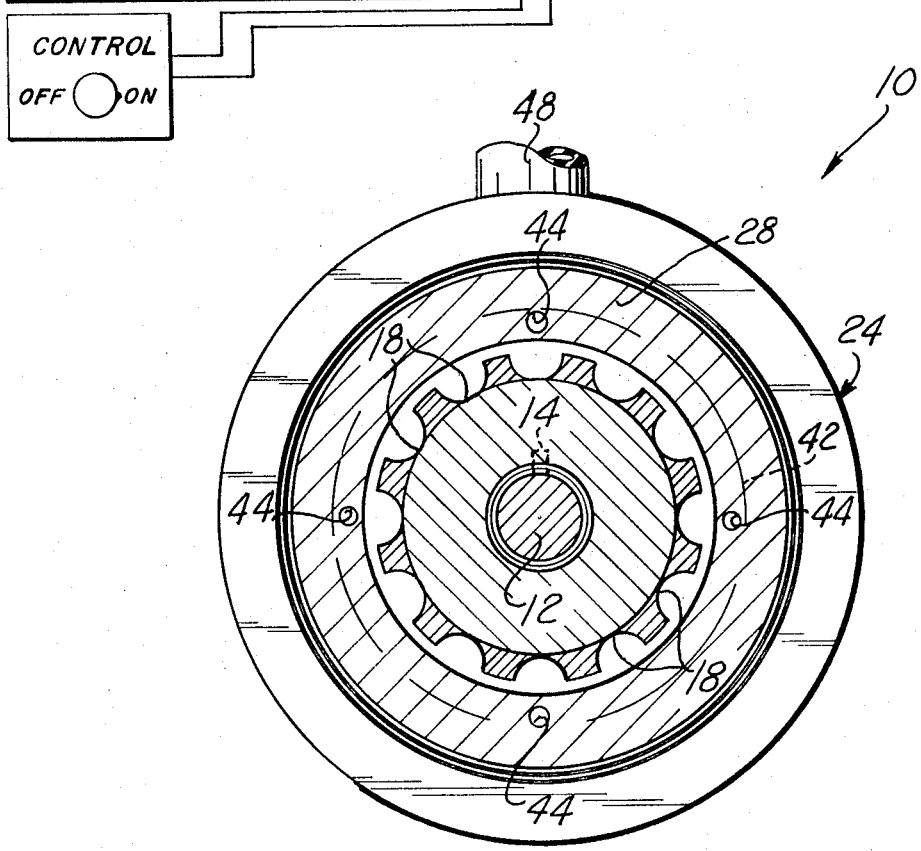
FIG. 3 is a cross-sectional side view of the dynamometer of FIG. 2 taken along section B—B.
Figure 2:
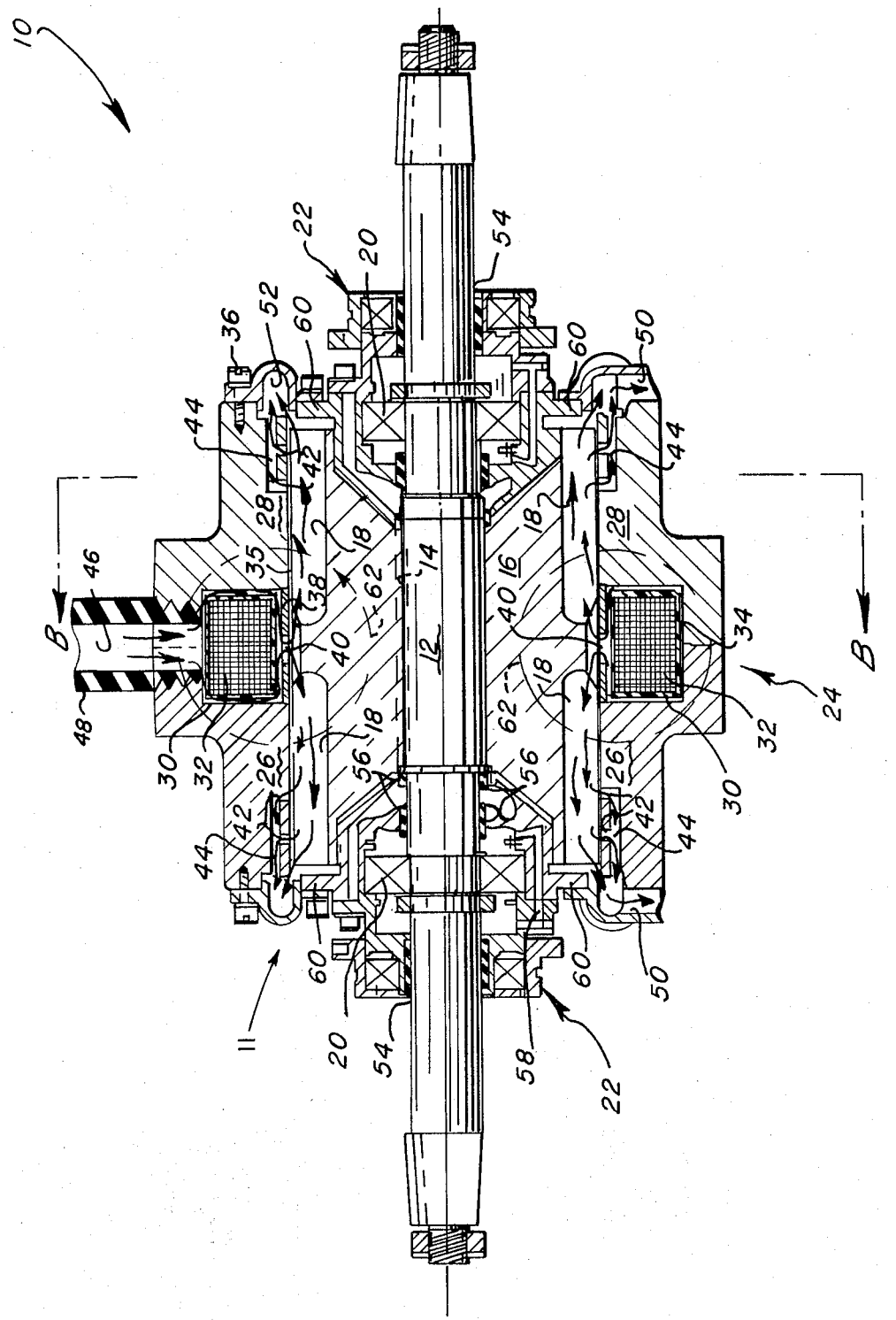
FIG. 2 is a cross-sectional view of the dynamometer of FIG. 1 taken along section A—A.

The engine 8 to be tested is connected to the dynamometer by a shaft 12. The engine 8 is connectable to either end of the shaft 12 by well known means such as the coupling 6. As best seen in FIGS. 2 and 3, the shaft 12 extends beyond the integral housing and stator assembly 24 through end cap assemblies 11 which provide seals 54 for the shaft 12 and allow the shaft 12 to be rotated by the engine 8 while maintaining the integral housing and stator assembly 24 sealed. The shaft 12 is keyed to the rotor 16 by a key 14 which allows the rotor 16 to integrally rotate with the shaft 12. Along the outer periphery of the rotor 16 are located a series of pole teeth members 18 as best seen in FIG. 2.

Spacedly extending around the pole members 18 is the integral housing and stator assembly 24 which is comprised of a ring section 26 and a ring section 28 fastened together by known means such as bolts, to provide a central annular opening 30. The integral housing and stator assembly 24 is formed from a less expensive material having a relatively high electrical resistivity in the range between 15 - 25 micro-ohm-centimeter when compared to more expensive prior art stator material having an electrical resistivity of approximately 11 micro-ohm-centimeter. This higher electrical resistivity of the present invention allows fields of equal or greater intensity than prior art devices to be established in the integral housing and stator 24 since a greater mass of material is used to construct the integral housing and stator assembly 24 providing currents equal or greater than that of the prior art devices to be generated in the present invention. This allows for effective coupling of the integral housing and stator assembly 24 and the rotor 16. The annular opening 30 of the integral housing and stator assembly 24 has an inlet 46 for inletting cooling fluid thereto and an orifice ring 38 mounted opposite the inlet 46 to cover the annular opening 30. The orifice ring 38 has a plurality of orifices 40 extending through the ring 38 to allow the cooling fluid to communicate with the inside of the integral housing assembly 24. The restrictions provided by the orifices 40 insure that the annular opening 30 will be pressurized and consequently maintain it full of cooling fluid.

Annular field coil 32 is mounted inside the annular opening 30 of the integral housing assembly 24. The field coil 32 is encased in a waterproof jacket 34 which prevents the cooling fluid from short circuiting or contaminating the windings of the field coil 32. The field coil 32 is energized by electric current supplied by a power source (not shown) supplying current to the coil 32 along lead wires (not shown) as is known. The energization of the field coil 32 magnetically couples the pole teeth members 18 of the rotor 16 to the housing assembly 24 by a flux path 62.

At the respective ends of the ring sections 26 and 28 are formed a pair of spaced grooves 42. These grooves 42 extend circumferentially around the ring sections 26 and 28 of the housing assembly to provide paths of travel for the cooling fluid as it is centrifugally moved along the magnetic gap 35 formed between the inside of the integral housing assembly 24 and the pole members 18. The cooling fluid is moved by the rotating action of the rotor 16. The circumferential grooves 42 are connected by passageways 44 which extend from the ends of the respective ring sections 26 and 28 into the main body of these sections to provide a path for communicating cooling fluid between the circumferential grooves 42 and the ends of the ring sections 26 and 28. The number and size of the circumferential grooves 42 is determined by the dissipation rating of the dynamometer assembly 10.

The integral housing assembly 24 is sealed at each end by end cap assemblies 11 which are fastened to the ring sections 26 and 28 by screws 36. Each end cap assembly 11 has an enlarged circumferential outlet section 52 located proximately to the passageways 44 to allow the cooling fluid to flow from the passageway 44 as well as from the magnetic gap 35 into the circumferential section 52. The circumferential section 52 communicates with the surroundings by way of outlets 50. The end cap assemblies 11 have bearings 20 to insure that the shaft 12 runs smoothly and relatively friction free when being rotated by the motor to be tested (not shown). The end cap assemblies further include labyrinth seals 54 mounted within a trunnion assembly 22. The trunnion assembly 22 allows the dynamometer assembly 10 to be rotated within the partially shown and stationary trunnion assembly 22 to provide an indication of the torque of the engine 8 coupled to the input shaft 12.

It will be appreciated that the dynamometer assembly 10 generates a great quantity of heat from eddy-currents induced in the integral housing assembly 24. The eddy-currents are induced by the pole members 18 cutting through the flux lines 62 whenever the pole members 18 are rotated by the rotation of the rotor 16 turning in response to the rotation of the motor being tested. To draw off and dissipate this eddy-current produced heat, cooling fluid is circulated through the dynamometer assembly 10. The cooling fluid may be either recirculated through a heat exchanger (not shown) connected between the outlets 50 and an inlet pipe 48 leading to inlet 46, or may involve the once through use of cooling fluid connected to input into line 48 and be exhausted at output lines 50.

The novel construction of the integral housing assembly 24 allows the dynamometer assembly 10 to effectively dissipate the generated eddy-current heat by providing intimate heat transfer contact between the cooling fluid and the integral housing assembly 24 along the entire path of cooling fluid travel from the inlet pipe 48 to the exhaust outlets 50.

This is accomplished by having the cooling fluid enter the annular opening 30 by way of inlet 46 where it is in contact with the watertight jacket 34 of the field coil 32 as well as the walls of the annular opening 30.

The orifices 40 in the orifice ring 38 provide an aggregate cooling fluid outlet area which is smaller than the inlet area of the inlet 46. As a result, the annular chamber formed by the annular opening 30 and the orifice ring 38 is pressurized and constantly maintained filled with cooling fluid. This insures maximum contact of the walls of chamber 30 and the field coil jacket 34 with the cooling fluid resulting in good heat dissipation by the cooling fluid of the heat generated by the operation of field coil 32 as well as the eddy-current heat generated in the integral housing assembly 24.

The cooling fluid exits from the annular chamber 30 by way of orifices 40 and enters into the magnetic gap 35 formed by the pole members 18 spacedly rotating within the integral housing assembly 24. The rotation of the pole members 18 drives the cooling fluid along the magnetic gap 35 toward the ends of the housing ring sections 26 and 28 by centrifugal action. As the cooling fluid approaches the ends of the integral housing 24, it is forced by centrifugal action into the circumferential grooves 42. These grooves 42 provide an increased time contact with the cooling fluid as well as increased heat transfer area to the cooling fluid. This allows the cooling fluid to pick up the residual eddy-current generated heat from the relatively thick part of the integral housing and stator assembly 24. To insure that the cooling fluid will not remain stagnant within the circumferential grooves 42, the passageways 44 are formed within the housing ring sections 26 and 28 to provide a separate outlet for the cooling fluid entering the circumferential grooves 42. These passageways 44, as best seen in FIG. 3, equal four equidistantly spaced bores extending from the ends of the housing ring sections 26 and 28 partially into the sections 26 and 28 to connect the circumferential grooves 42. It will be understood that although only two circumferential grooves are used in each of the ring sections 26 and 28, this number may be varied depending upon the desired heat rise of the dynamometer 10 and the amount of cooling required to provide the desired heat rise. Similarly, the number of passageways 44 may be varied to provide adequate outlets for the cooling fluid entering the circumferential rings 42.

The cooling fluid upon exiting from the integral housing assembly 24 through the passages 44 as well as exiting from the magnetic gap 35 enters the circumferential outlet 52 of the end cap assemblies 11. This circumferential outlet section 52 acts as a collection groove for the cooling fluid which has accepted the eddy-current generated heat from the integral housing assembly 24 as well as the heat from the field coil. The circumferential outlet section 52 directs the now "hot" cooling fluid to the outlets 50 which expel the cooling fluid from the dynamometer assembly 10 to be either cooled and recirculated to the inlet 46 of the dynamometer 10 or to be drained and disposed.

It will thus be appreciated that a unique eddy-current apparatus having an integral housing and stator assembly 24 has been disclosed which is simple in construction but capable of effectively generating eddy-current fields and dissipating the eddy-current and field coil heat generated therein. This integral housing and stator assembly 24 functions as the stator, as the supporting structure for field coil 32 and as the external housing of the dynamometer to provide a simple and inexpensive structure. While being simply constructed, this integral assembly effectively dissipates the eddy-current generated heat from itself through the uniquely structured circumferential grooves 42 connected by the passageways 44. Certain modifications and improvements will now become obvious to those skilled in the art upon a reading and understanding of this specification and the advantages of the present invention. As an example, the number and location of the grooves 42 and passageways 44 may be varied to meet the situation. It will be understood that all such modifications and changes are intended to be disclosed herein and are not specifically mentioned for the sake of conciseness and clarity.

I now claim:

1. A fluid cooled eddy-current apparatus comprising:
   a housing enclosure having a longitudinal portion and end portions substantially perpendicular to said longitudinal portion cooperating to define a chamber;
   an input shaft;
   a rotor located in said chamber of said housing;
   inductor means forming said longitudinal portion of said housing to define a first longitudinal inner surface enclosing said rotor and a second external longitudinal surface forming the outside surface of said housing;
   a field coil mounted proximately to said inductor means and said rotor for magnetically coupling said rotor and said longitudinal portion of said housing; and
   said inductor means forming a fluid inlet and fluid passage means, said fluid passage means being formed in said first inner surface of said inductor means to extend substantially perpendicularly to said inductor means from said first inner surface proximate to said rotor into said inductor means.

2. A fluid cooled eddy-current apparatus as defined by claim 1 wherein the fluid passage means formed in said first inner surface is formed to define a plurality of substantially parallel circumferential grooves extending into said inductor means, said inductor means further forming a passageway extending through said circumferential grooves to provide fluid communication between said grooves by way of said inductor means.

3. A fluid cooled eddy-current apparatus as defined by claim 1 wherein said end portions of said housing have a fluid outlet formed therein as an annular ring.

4. A fluid cooled eddy-current apparatus comprising:
   a shaft being adapted for connection to a motor at one end of said shaft;
   a rotor connected to said shaft to rotate in response to a rotation of said shaft by said motor;
   a pole member assembly mounted along the peripheral surface of said rotor to rotate with said rotor;
   a housing enclosure of inductor material, having an inner surface spacedly extending longitudinally around said pole member assembly of said rotor to provide a magnetic gap between said inner surface of said housing and said pole member assembly;
   a field coil mounted to said housing to electromagnetically couple said housing and said pole member assembly;
   cover means for enclosing the ends of said housing to allow said shaft to extend from said housing enclosure; and
   said housing forming at least a pair of circumferential grooves extending substantially normally into the body of said housing from said inner surface of said housing, said housing further forming a lateral passageway extending from one end of said housing and through said circumferential grooves.

5. A fluid cooled eddy-current apparatus as set forth in claim 2 wherein said housing has at least one passageway extending longitudinally into said housing to connect the circumferential grooves formed in said housing and allow fluid communication between the pair of circumferential grooves through said passage.

6. A fluid cooled eddy-current apparatus as set forth in claim 5 wherein said housing is formed to have an annular opening circumferentially extending from the inner surface of said housing, said field coil being mounted within the annular opening formed in said housing.

7. A fluid cooled eddy-current apparatus as set forth in claim 6 including a cover ring extending along the pole member side of the annular opening in said housing to enclose said field coil in the annular opening thereby, said cover ring having an orifice passageway to allow fluid communication between the annular opening and the space between said housing and said pole members.

8. A fluid cooled eddy-current apparatus as set forth in claim 7 wherein the cooling fluid is water, and including a waterproof jacket for enclosing said field coil therein.

9. A fluid cooled eddy-current apparatus as set forth in claim 7 wherein said cover means includes a pair of end plates, each end plate having an outlet and a collector groove for communicating the fluid from the space between said housing and said pole members to the outlet.

10. A fluid cooled eddy-current apparatus as set forth in claim 9 wherein said housing forms at least a pair of grooves at each end of said housing with at least one passageway extending longitudinally into said housing from each end of said housing to connect each of the pair of grooves and allow fluid communication between the pair of grooves and the collector groove in said end plate nearest the pair of grooves.

11. A fluid cooled eddy-current apparatus as set forth in claim 10 wherein said housing has formed therein at each end of said housing three passageways spaced along the circumference of said housing to connect the pair of grooves formed at each end of said housing.

12. A fluid cooled eddy-current apparatus as set forth in claim 11 wherein said housing acts as the stator of said eddy-current apparatus and said housing is formed of a suitable stator material having an electrical resistivity substantially in the range of 15 to 25 micro-ohm-centimeter.

13. A fluid cooled dynamometer assembly for testing motor torque comprising:
a rotor assembly connectable to the tested motor to rotate with any rotation of the tested motor;
a housing having an enclosing side extending around said rotor assembly and having an annular chamber formed therein;
a field coil mounted in the annular chamber of said housing to electromagnetically couple said rotor assembly and said housing;
said housing having a series of circumferential grooves formed in the enclosing side of said housing with said grooves being connected by a passageway to allow the cooling fluid to be communicated along the enclosing side of said housing; and
said series of circumferential grooves formed in the enclosing side of said housing providing an increased area to the cooling fluid with said passageway extending through an end of said housing to allow the cooling fluid entering said circumferential grooves to be exhausted from the end of said housing.

14. A fluid-cooled dynamometer assembly comprising:
an input shaft;
a rotor assembly connected to said input shaft to rotate therewith;
an elongate housing composed of a material having an electrical resistivity substantially in the range of 15 to 25 micro-ohms per centimeter and having an internal surface therein which defines an annular chamber;
said rotor assembly being located in said annular chamber and being spaced from said internal surface of said elongate housing by a magnetic gap;
an annular field coil having an energized condition for electromagnetically coupling said rotor assembly to said housing so that rotation of said rotor assembly causes a rotation of said housing;
a fluid inlet for directing fluid flow through said annular chamber of said housing to effect cooling of said rotor assembly and said housing; and
a fluid outlet for directing fluid flow from said annular chamber.

15. A fluid-cooled dynamometer assembly as set forth in claim 14 wherein said field coil when energized establishes a flux path extending from said field coil to said housing and therefrom across said magnetic gap to said rotor assembly.

16. A fluid cooled eddy-current apparatus comprising:
a shaft being adapted for connection to a motor at one end of said shaft;
a rotor connected to said shaft to rotate in response to a rotation of said shaft by said motor;
a pole member assembly mounted along the peripheral surface of said rotor to rotate with said rotor;
a housing enclosure of inductor material, having an inner surface spacedly extending longitudinally around said pole member assembly of said rotor to provide a magnetic gap between said inner surface of said housing and said pole member assembly;
a field coil mounted to said housing to electromagnetically couple said housing and said pole member assembly;
cover means for enclosing the ends of said housing to allow said shaft to extend from said housing enclosure;
said housing forming at least a pair of circumferential grooves extending substantially normally into the body of said housing from said inner surface of said housing, said housing also having at least one passageway extending longitudinally into said housing to connect the circumferential grooves formed in said housing and allowing fluid communication between the pair of circumferential grooves through said passageway, said housing also being formed to have an annular opening circumferentially extending from the inner surface of said housing, said field coil being mounted within the annular opening formed in said housing, and said housing also having an inlet formed to extend into the annular opening of said housing and an outlet formed in said cover means, said inlet and said outlet establishing a fluid flow path from the inlet to the annular opening, therefrom to the space between said housing and said pole members, therefrom partially into the circumferential grooves, and from the grooves to the passageway and into the outlet.

* * * * *